(12) United States Patent
Murayama et al.

(10) Patent No.: US 11,264,872 B2
(45) Date of Patent: Mar. 1, 2022

(54) SETTING DEVICE FOR ROTOR CORE RETAINING JIG

(71) Applicant: Kuroda Precision Industries Ltd., Kanagawa (JP)

(72) Inventors: Tomoaki Murayama, Nagano (JP); Osamu Fukuyama, Kanagawa (JP); Masanobu Ikeda, Nagano (JP)

(73) Assignee: Kuroda Precision Industries Ltd., Kanagawa (JP)

( * ) Notice: Subject to any disclaimer, the term of this patent is extended or adjusted under 35 U.S.C. 154(b) by 0 days.

(21) Appl. No.: 15/734,250

(22) PCT Filed: Mar. 12, 2019

(86) PCT No.: PCT/JP2019/009998
§ 371 (c)(1),
(2) Date: Dec. 2, 2020

(87) PCT Pub. No.: WO2020/075323
PCT Pub. Date: Apr. 16, 2020

(65) Prior Publication Data
US 2021/0234440 A1    Jul. 29, 2021

(30) Foreign Application Priority Data
Oct. 11, 2018    (WO) .................. PCT/JP2018/037977

(51) Int. Cl.
*B23P 19/00*    (2006.01)
*H02K 15/03*    (2006.01)
(Continued)

(52) U.S. Cl.
CPC ....... *H02K 15/03* (2013.01); *B29C 45/14065* (2013.01); *H02K 1/28* (2013.01);
(Continued)

(58) Field of Classification Search
CPC .......... H02K 1/276; H02K 15/03; H02K 1/27; H02K 21/046; Y10T 29/49012;
(Continued)

(56) References Cited

U.S. PATENT DOCUMENTS 9,705,369 B2    7/2017    Ishimatsu
9,768,673 B2 *  9/2017    Nagai .................... H02K 15/03
(Continued)

FOREIGN PATENT DOCUMENTS

JP    2018130026    3/2006
JP    2012223024    11/2012
(Continued)

OTHER PUBLICATIONS

Chinese Office Action for CN201880017134.0 dated Jul. 23, 2020, 7 pages.
(Continued)

*Primary Examiner* — Thiem D Phan
(74) *Attorney, Agent, or Firm* — Dority & Manning, P.A.

(57) ABSTRACT

To automate setting of coupling rods when using a rotor core retaining jig and thereby to improve the production efficiency of a magnet embedded core, a setting device includes: a support base (42) on which the rotor core retaining jig (10) is to be placed; an opposing base (46) joined to the support base 42 to oppose the support base (42); a pressurizing device (48) provided on the opposing base (46) and configured to pressurize an upper plate (14) of the rotor core retaining jig (10) on the support base (42) toward a lower plate (12); chuck devices (126) provided on the support base (42) to releasably grip the coupling rods (30) and capable of moving between a separated position where the coupling rods (30) are separated from engagement grooves (32, 34) and an engaged position where the coupling rods (30) engage the engagement grooves (32, 34); and a
(Continued)

fluid pressure cylinder device (120) provided on the support base (42) to drive each chuck device (126) between the separated position and the engaged position.

5 Claims, 12 Drawing Sheets

(51) Int. Cl.
  *H02K 1/28*    (2006.01)
  *H02K 15/12*   (2006.01)
  *B29C 45/14*   (2006.01)
  *H02K 1/276*   (2022.01)
  *B29L 31/00*   (2006.01)

(52) U.S. Cl.
  CPC ...... *H02K 15/12* (2013.01); *B29L 2031/7498* (2013.01); *H02K 1/276* (2013.01); *Y10T 29/5313* (2015.01); *Y10T 29/53143* (2015.01)

(58) Field of Classification Search
  CPC ......... Y10T 29/49009; Y10T 29/49002; Y10T 29/5313; Y10T 29/53143
  USPC ......... 29/732, 596, 598, 604, 607, 729, 734, 29/736
  See application file for complete search history.

(56) References Cited

U.S. PATENT DOCUMENTS

| | | | |
|---|---|---|---|
| 9,947,464 | B2 * | 4/2018 | Nagai .................. H02K 15/03 |
| 10,608,513 | B2 | 3/2020 | Kino |
| 2007/0134368 | A1 | 6/2007 | Okamoto et al. |
| 2019/0044423 | A1 | 2/2019 | Fukuyama |

FOREIGN PATENT DOCUMENTS

| | | |
|---|---|---|
| JP | 2013243889 | 12/2013 |
| JP | 2014036486 | 2/2014 |
| JP | 2014046553 | 3/2014 |
| JP | 2014079056 | 5/2014 |
| JP | 2014091220 | 5/2014 |
| JP | 2015035888 | 2/2015 |
| JP | 2015192576 | 11/2015 |
| JP | 2017007353 | 1/2017 |
| WO | WO2006022392 | 3/2006 |
| WO | WO2012026003 | 3/2012 |
| WO | WO2017179398 | 10/2017 |
| WO | WO2017179547 | 10/2017 |

OTHER PUBLICATIONS

European Search Report for EP 18899035.2 dated Jun. 16, 2020, 11 pages.
International Search Report for PCT/JP2019/009998 dated Jun. 3, 2019, 1 page.
Supplementary European Search Report for EP18899035 dated Jan. 31, 2020, 4 pages.

* cited by examiner

SETTING DEVICE FOR ROTOR CORE RETAINING JIG

CROSS REFERENCE TO RELATED APPLICATIONS

This application is the U.S. National Stage entry of International Application Number PCT/JP2019/009998 filed under the Patent Cooperation Treaty having a filing date of Mar. 12, 2019, which claims priority to International Application Number PCT/JP2018/037977 filed under the Patent Cooperation Treaty having a filing date of Oct. 11, 2018, both of which are incorporated herein by reference.

TECHNICAL FIELD

The present invention relates to a setting device a setting method for a rotor core retaining jig, and more particularly to a setting device for a rotor core retaining jig used in manufacture of a magnet embedded core.

BACKGROUND ART

As a magnet embedded core used in rotating electric machinery such as an electric motor, there is known a resin-sealed type magnet embedded core which includes: a rotor core provided with a magnet insertion hole having openings in two axial end surfaces of the rotor core, respectively; a magnet disposed in the magnet insertion hole; and resin filling the magnet insertion hole to fix the magnet to the rotor core.

As a manufacturing device for this kind of magnet embedded core, there is known a resin molding device which includes a fixed die and a movable die opposing each other and is configured to pressurize the rotor core in the axial direction by use of the fixed die and the movable die so that molten resin is injected to fill the magnet insertion hole from a resin pot provided in the fixed die or the movable die (for example, Patent Documents 1 and 2).

PRIOR ART DOCUMENT(S)

Patent Document(s)

Patent Document 1: JP2014-79056A
Patent Document 2: JP2017-7353A

SUMMARY OF THE INVENTION

Task to be Accomplished by the Invention

In the manufacture of the magnet embedded core using the aforementioned resin molding device, the same applicant as that of the present application has conceived using a rotor core retaining jig including a first plate and a second plate that oppose each other and coupling rods each configured to engage engagement grooves in the form of cutouts opening toward peripheral edges of the first plate and the second plate such that flange portions at respective ends of each coupling rod contact against the first plate and the second plate, respectively, to couple the first plate and the second plate to each other and to pre-clamp the rotor core disposed between the first plate and the second plate (PCT/JP2018/037977).

An object of the present invention is to automate the setting of the coupling rods when using the aforementioned rotor core retaining jig and thereby to increase the production efficiency of the magnet embedded core.

Means to Accomplish the Task

A setting device according to one embodiment of the present invention is a setting device for a rotor core retaining jig, the rotor core retaining jig comprising a first plate and a second plate that oppose each other and coupling rods each configured to engage engagement grooves in a form of cutouts opening at peripheral edges of the first plate and the second plate such that flange portions at respective ends of each coupling rod contact against the first plate and the second plate, respectively, to couple the first plate and the second plate to each other, wherein a rotor core is to be disposed between the first plate and the second plate, the setting device comprising: a support base on which the rotor core retaining jig is to be placed; an opposing base joined to the support base to oppose the support base; a pressurizing device mounted on the opposing base and configured to pressurize the second plate of the rotor core retaining jig on the support base toward the first plate; chuck devices mounted on the support base to grip the respective coupling rods and capable of moving between a separated position where the coupling rods are separated from the engagement grooves and an engaged position where the coupling rods engage the engagement grooves; and a drive device provided on the support base to drive each chuck device between the separated position and the engaged position.

According to this configuration, the setting of the coupling rods is automated and the production efficiency of the magnet embedded core is improved.

In the setting device according to the aforementioned embodiment, preferably, the rotor core includes a magnet insertion hole having openings in two axial end surfaces of the rotor core, respectively, the first plate includes a gate configured to communicate with one of the openings of the magnet insertion hole, the rotor core retaining jig further includes a closure member coupled to the second plate via a compression spring member and configured to contact against one end surface of the end surfaces of the rotor core to close the other of the openings of the magnet insertion hole, and each coupling rod has an axial length to couple the first plate and the second plate to each other such that in a state where the closure member closes the opening, a spring force of the compression spring member becomes a prescribed value.

According to this configuration, the axial compressive force acting on the rotor core is prevented from becoming unnecessarily large, and the closure of the opening of the magnet insertion hole by the closure member is achieved appropriately by the spring force of the compression spring member.

In the setting device according to the aforementioned embodiment, preferably, the first plate and the second plate are each rectangular in shape and have the engagement grooves corresponding to at least two sides that are parallel to each other, and the chuck devices are provided respectively corresponding to the at least two sides of the first plate and the second plate of the rotor core retaining jig placed on the support base.

According to this configuration, the coupling between the first plate and the second plate can be achieved without fail by the coupling rods engaging the respective engagement grooves and the setting of each coupling rod can be automated.

In the setting device according to the aforementioned embodiment, preferably, the chuck devices are configured to be movable between an operating position which is a position corresponding to between the support base and the opposing base and where the chuck devices are movable between the separated position and the engaged position and a retracted position where the chuck devices do not interfere with the rotor core retaining jig being loaded onto or being unloaded from the support base.

According to this configuration, loading and unloading of the rotor core retaining jig to and from the support base is performed efficiently without interference with the chuck devices.

In the setting device according to the aforementioned embodiment, preferably, the support base and the opposing base are spaced from and oppose each other in a vertical direction and the second plate which is positioned on an upper side has a larger outline than the first plate which is positioned on a lower side, and when not gripped by the chuck devices, the coupling rods engage only the engagement grooves of the second plate and are supported by the second plate in a suspended state.

According to this configuration, a step of handling the coupling rods relative to the first plate and the second plate becomes unnecessary and the work efficiency is improved.

Effect of the Invention

Thus, according to the embodiment of the present invention, the setting of the coupling rods can be automated when using the rotor core retaining jig and the production efficiency of the magnet embedded core can be improved.

MODES FOR CARRYING OUT THE INVENTION

Figure 1:
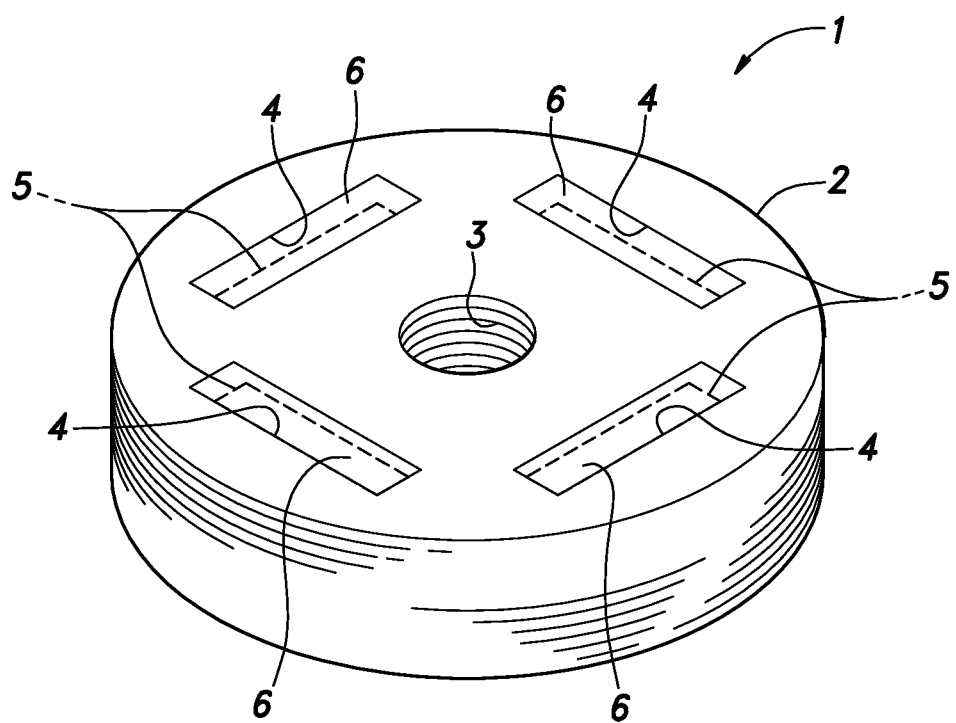
FIG. 1 is a perspective view showing an example of a magnet embedded core to which a setting device for a rotor core retaining jig according to one embodiment of the present invention is applied.

Preferred embodiments of the present invention are described in the following with reference to the appended drawings.

First of all, a magnet embedded core 1 manufactured by a setting device for a rotor core retaining jig according to an embodiment of the present invention is described with reference to FIGS. 1 and 2.

The magnet embedded core 1 is a component part of rotating electric machinery such as an electric motor, and includes a rotor core 2. The rotor core 2 consists of a laminated iron core formed by stacking a plurality of electromagnetic steel sheets and joining the electromagnetic steel sheets together by using a known joining method (such as crimping, welding, gluing, etc.). The rotor core 2 is substantially annular in shape in plan view, and is centrally provided with a shaft hole 3 extending therethrough in an axial direction.

The rotor core 2 is formed with multiple magnet insertion holes 4 each defining a substantially rectangular parallelepiped space. The magnet insertion holes 4 extend through the rotor core 2 in the axial direction, and each open out at a lower end surface 2A and an upper end surface 2B which are the end surfaces of the rotor core 2. Namely, each magnet insertion hole 4 is a through hole having openings in the two axial end surfaces of the rotor core 2, respectively. In the illustrated example, the magnet insertion holes 4 are arranged at four positions spaced in the circumferential direction of the rotor core 2 at equal intervals, but the shape, number, arrangement, etc. of the magnet insertion holes 4 are not limited to this and various modifications are possible.

A substantially rectangular parallelepiped shaped magnet 5 is received in each magnet insertion hole 4. The magnet 5 may consist of a permanent magnet (with or without magnetization) such as a ferrite-based sintered magnet or a neodymium magnet, for example. The dimensions of each magnet 5 are slightly smaller than the corresponding dimensions of the magnet insertion hole 4. As a result, a gap is created between the rotor core 2 and the magnet 5 in each magnet insertion hole 4. This gap is filled with resin 6, and each magnet 5 is fixed to the rotor core 2 by the resin 6 filling the gap. The resin 6 may consist of thermosetting resin such as epoxy resin.

Figure 2:
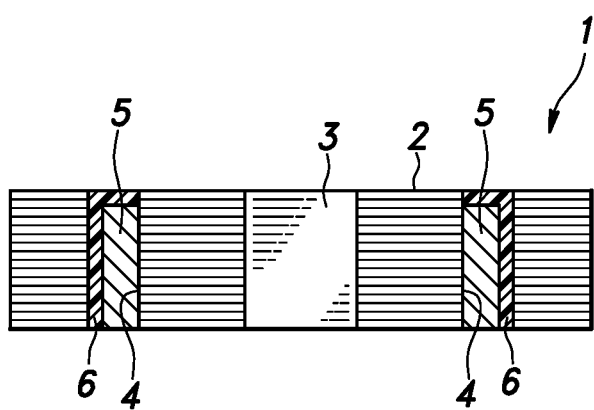
FIG. 2 is a vertical sectional view of the magnet embedded core.

As shown in FIG. 1, the magnet 5 in each magnet insertion hole 4 is inwardly offset (or offset toward the center of the rotor core 2) so that the outer surface of the magnet 5 on the inner side thereof contacts against the inner surface of the magnet insertion hole 4 opposing it. Thereby, the magnets 5 are uniformly arranged in regard to the radial positioning thereof. This, in cooperation with the magnet insertion holes 4 arranged at regular intervals in regard to the circumferential positioning thereof with respect to the rotor core 2, prevents the magnets 5 from causing any rotational imbalance of the rotor core 2. The magnets 5 may also be offset in the opposite radial direction from that shown in FIG. 1 (or offset away from the center of the rotor core 2).

Next, with reference to FIGS. 3 and 4, a rotor core retaining jig 10 used in the manufacture of the magnet embedded core will be described.

The rotor core retaining jig 10 includes a lower plate (first plate) 12 and an upper plate (second plate) 14 that oppose each other.

The lower plate 12 consists of a rectangular flat plate and the rotor core 2 is placed thereon such that the flat lower end surface 2A contacts the flat top surface 12A. The lower plate 12 includes gates 20 each configured to individually communicate with a lower opening (one opening) 4A of the corresponding magnet insertion hole 4 and cull openings 22 communicating with the respective gates 20 and respective resin pots 80 of a later-described resin molding device 60.

The upper plate 14 is constituted of a rectangular flat plate, and opposes the upper end surface 2B of the rotor core 2. The upper plate 14 supports closure members 26 for the respective magnet insertion holes 4 by associated bolts 24 in a suspended manner so as to be movable vertically. Each closure member 26 includes a flat bottom surface 26A having an area larger than that of an upper opening (the other opening) 4B of the magnet insertion hole 4 and capable of contacting against the flat upper end surface 2B of the rotor core 2. The lower limit position of each closure member 26 is determined by contacting of a head 24A of the associated bolt 24 against a shoulder-shaped bottom of an associated bolt insertion hole 14A formed in the upper plate 14.

A compression coil spring 28 is attached between the upper plate 14 and each closure member 26. The compression coil spring 28 is individually provided for each closure member 26, and urges the closure member 26 toward the lower plate 12. In the illustrated embodiment, the closure members 26 and the compression coil springs 28 are provided for the respective magnet insertion holes 4, but they may be provided for respective groups of adjoining magnet insertion holes 4.

The upper plate 14 has a larger outline than the lower plate 12 and, as shown in plan view, includes a rectangular frame-shaped projecting portion 15 that projects outward from the outer edge of the lower plate 12.

The lower plate 12 and the upper plate 14 are coupled to each other by vertically extending coupling rods 30 in four positions at front and rear on left and right sides, with the rotor core 2 being sandwiched between the lower plate 12 and the closure members 26.

Details of the coupling structure of the lower plate 12 and the upper plate 14 by the coupling rods 30 will now be described. Each coupling rod 30 includes a rod portion 30A and flange portions 30B, 30C respectively provided at upper and lower ends of the rod portion 30A.

The lower plate 12 and the upper plate 14 are formed with engagement grooves 32, 34 in the form of cutouts each extending linearly in the left and right direction and opening at one of mutually parallel outer edges (peripheral edges) of these plates 12, 14. The engagement grooves 32, 34 are provided corresponding to mutually parallel two sides (left side and right side) of the lower plate 12 and the upper plate 14 and are arranged to be vertically aligned. As shown in partial enlarged perspective views (A) and (B) in FIG. 3, the engagement grooves 32, 34 respectively include recessed grooves 32A, 34A which the flange portions 30B, 30C of the coupling rod 30 can engage, and slit-shaped openings 32B, 34B formed in the bottoms of the recessed grooves 32A, 34A such that the rod portion 30A can pass therethrough, and the flange portions 30B, 30C contact against shoulder portions 32C, 34C defined by parts of the recessed grooves 32A, 34A remaining on both sides of the openings 32B, 34B.

Thus, by engagement of each coupling rod 30 with the lower plate 12 and the upper plate 14, the coupling rods 30 couple the lower plate 12 and the upper plate 14 to each other such that the spring force of each compression coil spring 28 becomes a prescribed value. The spring force of each compression coil spring 28 (amount of deformation of each compression coil spring 28) produced in this coupled state is set to an appropriate value by an axial length of the rod portion 30A.

Thereby, each closure member 26 is pressed against the upper end surface 2B of the rotor core 2 due to the spring force of the compression coil spring 28 to close the upper opening 4B of the corresponding magnet insertion hole 4.

The entirety of each flange portion 30B, 30C is accommodated in the corresponding recessed groove 32A, 34A, and does not protrude below the lower plate 12 or above the upper plate 14. Note that this structure is not indispensably, and depending on the plate configuration, the recessed grooves 32A, 34A may be omitted and the flange portions 30B, 30C may protrude below the lower plate 12 and/or above the upper plate 14.

As shown by imaginary lines in FIG. 3, the coupling rods 30 are positioned in the projecting portion 15 of the upper plate 14, whereby when not griped by later described chuck devices 126, do not engage the engagement grooves 32 of the lower plate 12 and can engage only the engagement grooves 34 of the upper plate 14 to be supported by the upper plate 14 in a suspended state.

Thereby, each coupling rod 30 is always supported by the upper plate 14 in a suspended manner and selectively engage the corresponding engagement groove 32 of the lower plate 12 when moved in the left and right direction. Therefore, a step of handling the coupling rods 30 relative to the lower plate 12 and the upper plate 14 becomes unnecessary and the work efficiency is improved.

Base ends (lower ends) 36A of plate pressing rods 36 are fixed to the lower plate 12 at two positions that are spaced from each other in the left and right direction and in the front and rear direction. The plate pressing rods 36 extend vertically upward from the lower plate 12 to pass through respective through holes 38 formed in the upper plate 14 in a loosely fitted manner, and each include a free end (upper end) 36B located above the upper plate 14. Note that the number of arrangement positions of the plate pressing rods 36 is not limited to two and may be more than two.

Owing to the user of the aforementioned rotor core retaining jig 10, the axial compressive force acting on the rotor core 2 is prevented from becoming unnecessarily large, and the closing of the openings 4B of the magnet insertion holes 4 by the closure members 26 is achieved appropriately by the spring force of the compression coil springs 28.

Next, with reference to FIG. 5 to FIG. 8, a setting device 40 for setting the rotor core 2 to the rotor core retaining jig 10 will be described.

The setting device 40 includes a flat plate-shaped support base 42, a flat plate-shaped opposing base 46 disposed above the support base 42 to oppose the same by multiple post members 44 extending upright from the support base 42, a hydraulic pressurizing device (cylinder-piston device) 48 mounted on the opposing base 46, and a flat plate-shaped pressurizing plate 52 mounted on a piston rod 50 of the pressurizing device 48. The pressurizing device 48 pressurizes the upper plate 14 of the rotor core retaining jig 10 placed on the support base 42 against the lower plate 12 with the pressurizing plate 52.

Lifting mounts 112 each being guided by a guide rail 110 to be movable in the vertical direction are provided on the left and right sides of the support base 42, respectively. Each lift base 112 is caused to move up and down by a feed screw 116 driven by an electric motor 114. A cylinder attachment plate 118 is attached to each lift base 112, and a fluid pressure cylinder device (drive device) 120 is attached to each cylinder attachment plate 118. Each fluid pressure cylinder device 120 includes a piston rod 122 extending inward toward the support base 42. A chuck attachment plate 124 is mounted to the tip end of each piston rod 122.

Figure 8:
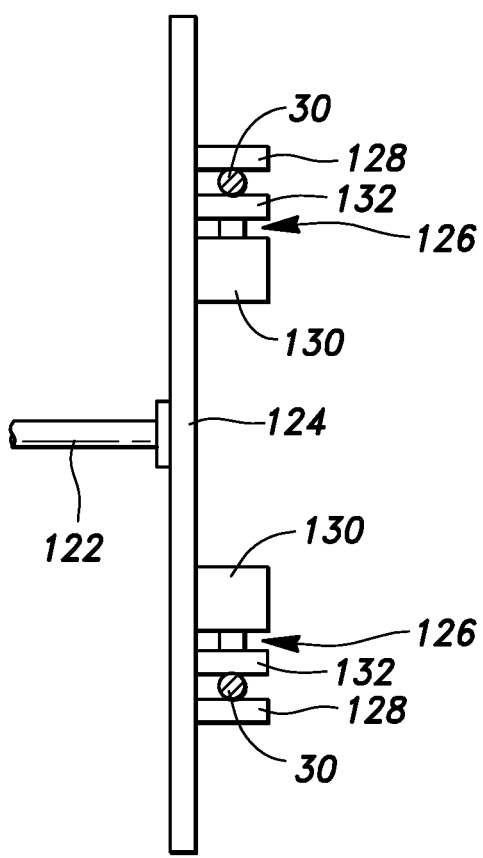
FIG. 8 is a plan view of the chuck device of the setting device.

As shown in FIG. 8, two chuck devices 126 are mounted on each chuck attachment plate 124 to correspond to the respective coupling rods 30. Each chuck device 126 a fixed chuck piece 128 fixed to the chuck attachment plate 124 and a movable chuck piece 132 configured to be driven by an electromagnetic actuator 130 and releasably grips the rod portion 30A of the corresponding coupling rod 30 with the fixed chuck piece 128 and the movable chuck piece 132.

Figure 5:
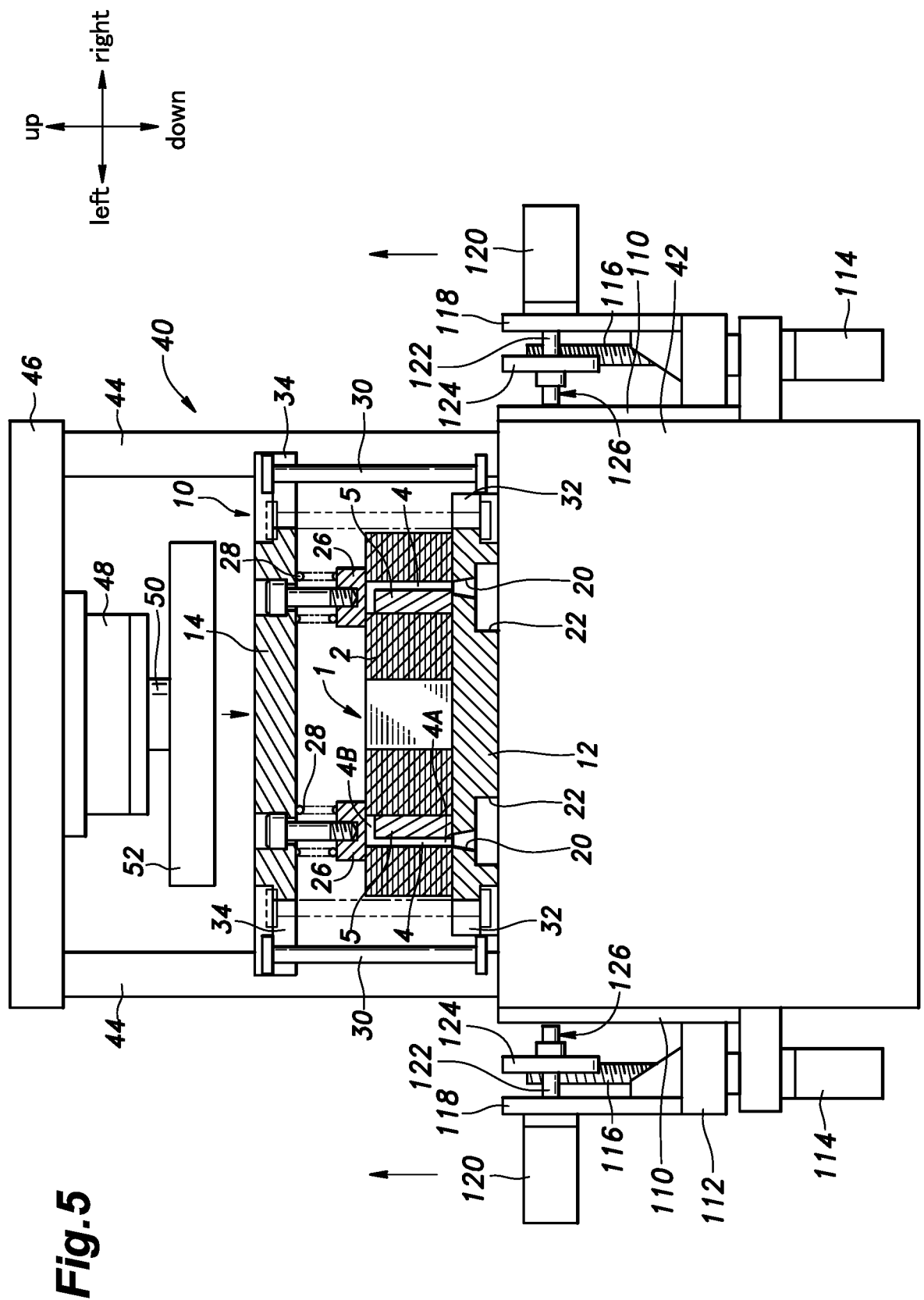
FIG. 5 is a front view showing a retracted state of a setting device for the rotor core retaining jig according to the present embodiment.
Figure 6:
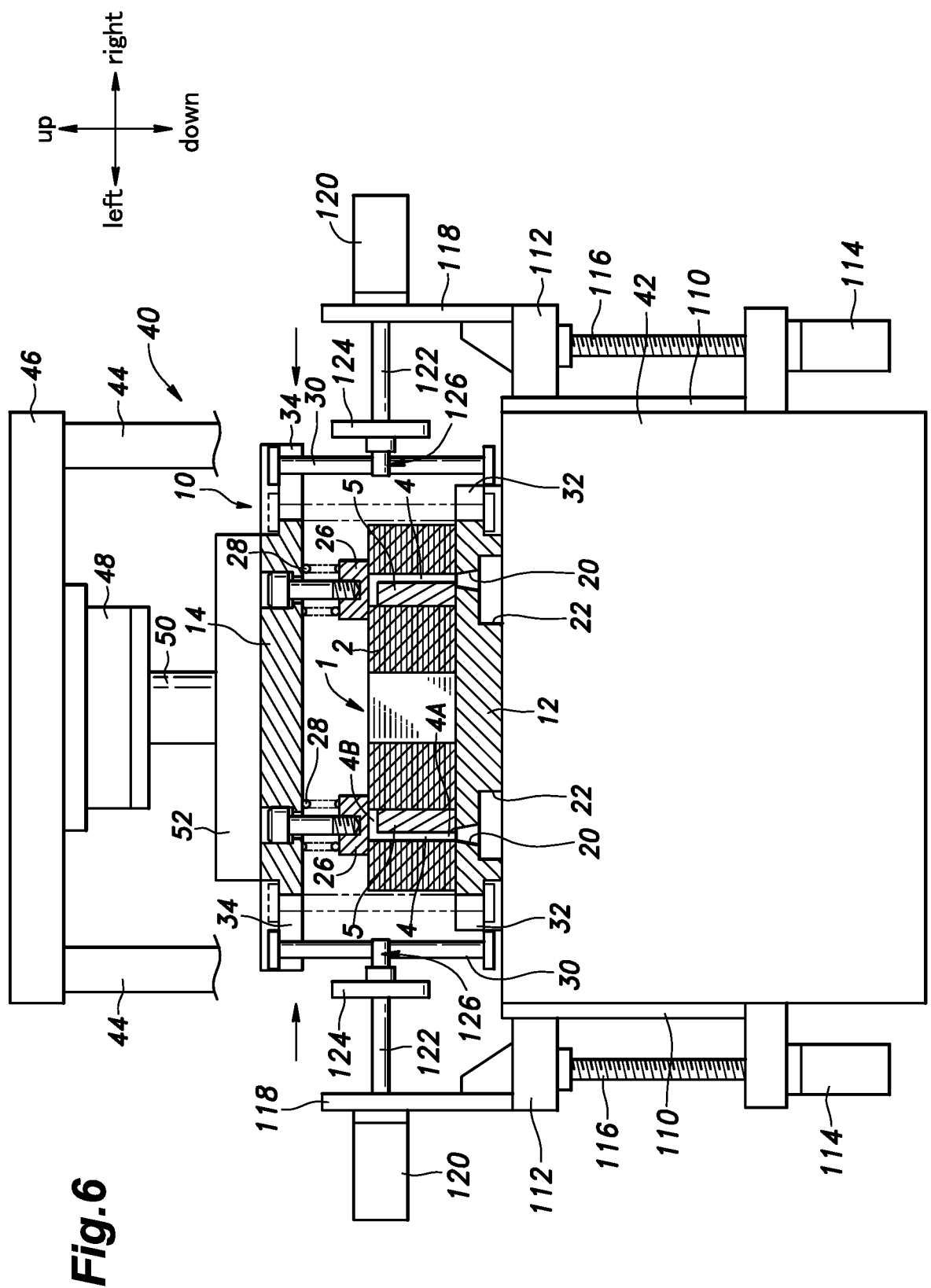
FIG. 6 is a front view showing a chuck separated state of the setting device.
Figure 7:
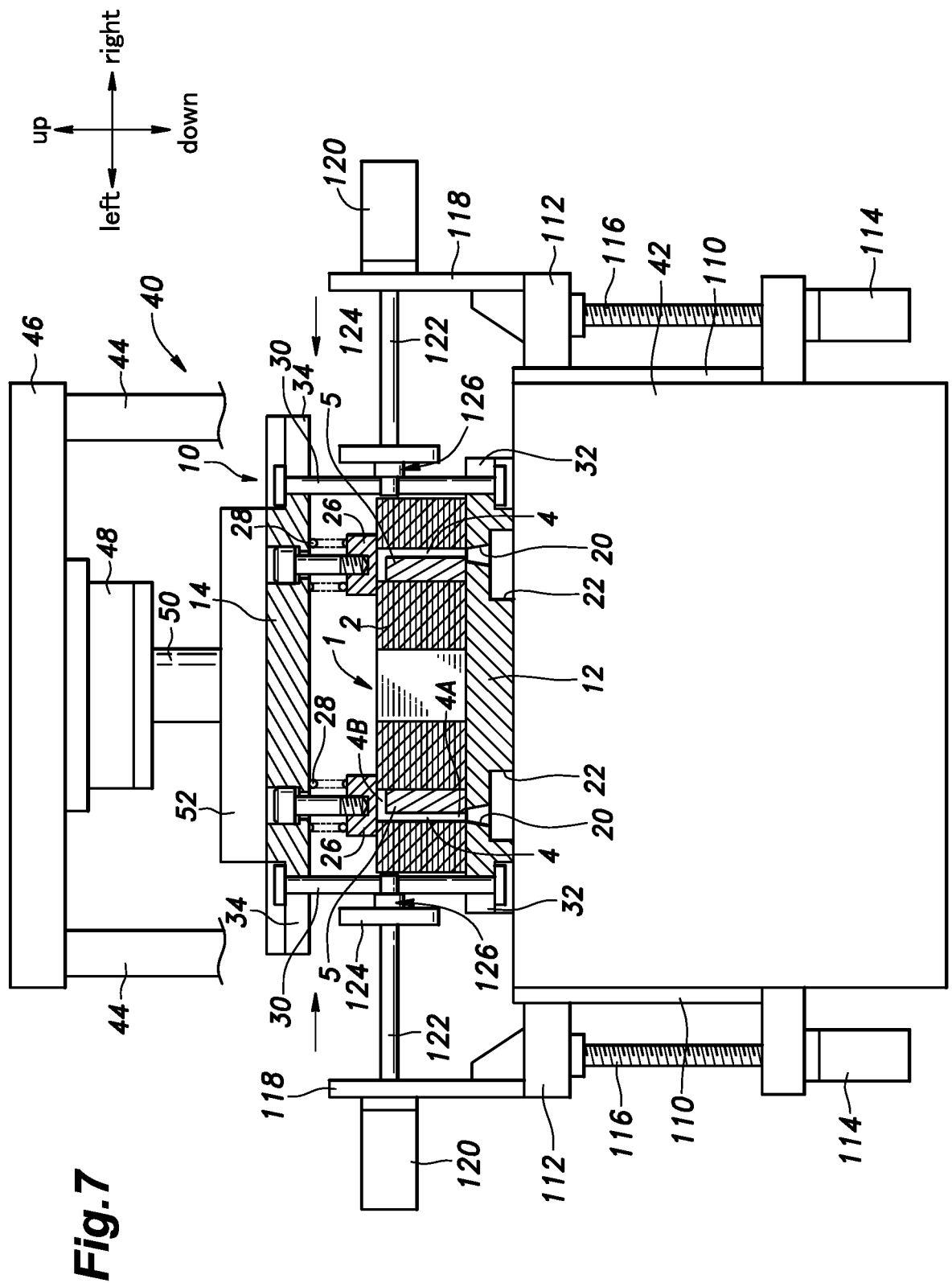
FIG. 7 is a front view showing a chuck engaged state of the setting device.

Each lift base 112 is caused to move up and down by the feed screw 116 between a retracted position where, as shown in FIG. 5, the chuck device 126 and the fluid pressure cylinder device 120 are positioned lower than the top surface of the support base 42 and an operating position where, as shown in FIG. 6 and FIG. 7, the chuck device 126 and the fluid pressure cylinder device 120 are positioned higher than the top surface of the support base 42.

When the lift base 112 is in the retracted position, the chuck device 126 and the fluid pressure cylinder device 120 do not interfere with the rotor core retaining jig 10 that is loaded onto and unloaded from the support base 42 in the left and right direction. Thereby, the loading and unloading of the rotor core retaining jig 10 to and from the setting device 40 is performed without interfering with the chuck devices 126 and the like.

Each chuck device 126 is caused to move by the fluid pressure cylinder device 120 in the left and right direction between a most withdrawn position where, as shown in FIG. 5, the chuck device 126 does not interfere with the support base 42 with the lift base 112 being in the aforementioned retracted position, a separated position where, as shown in FIG. 6, the corresponding coupling rod 30 is separated from the engagement groove 32 with the lift base 112 being in the aforementioned operating position, and an engaged position where, as shown in FIG. 7, the corresponding coupling rod 30 engages the engagement groove 32 in addition to the engagement groove 34 with the lift base 112 being in the aforementioned operating position.

In the setting of the rotor core 2 in the rotor core retaining jig 10 using the setting device 40, first, the rotor core 2 is loaded onto the support base 42 by a robot arm or the like (not shown), with each lift base 112 being in the retracted position, as shown in FIG. 5. Note that prior to the loading, the magnet 5 is inserted in each magnet insertion hole 4 of the rotor core 2.

Subsequently, each electric motor 114 is driven to raise the lift base 112 to the operating position, and the pressurizing device 48 is driven to press the pressurizing plate 52 against the upper plate 14. As a result, the upper plate 14 is lowered and each compression coil spring 28 undergoes compressive deformation.

In this state, the fluid pressure cylinder devices 120 are driven so that each chuck device 126 advances to the separated position as shown in FIG. 6, and the electromagnetic actuators 130 are driven so that each chuck device 126 grips the corresponding coupling rod 30 supported by the upper plate 14 in a suspended manner.

After the gripping is completed, the fluid pressure cylinder devices 120 are driven so that each chuck device 126 advances to the engaged position. Thereby, each coupling rod 30 engages the engagement groove 32 of the lower plate 12 in addition to the engagement groove 34 of the upper plate 14.

Thereafter, the pressing of the upper plate 14 by the pressurizing plate 52 is released, whereby the lower plate 12 and the upper plate 14 are coupled to each other by the coupling rods 30, with the spring force of each compression coil spring 28 being a prescribed value.

Figure 3:
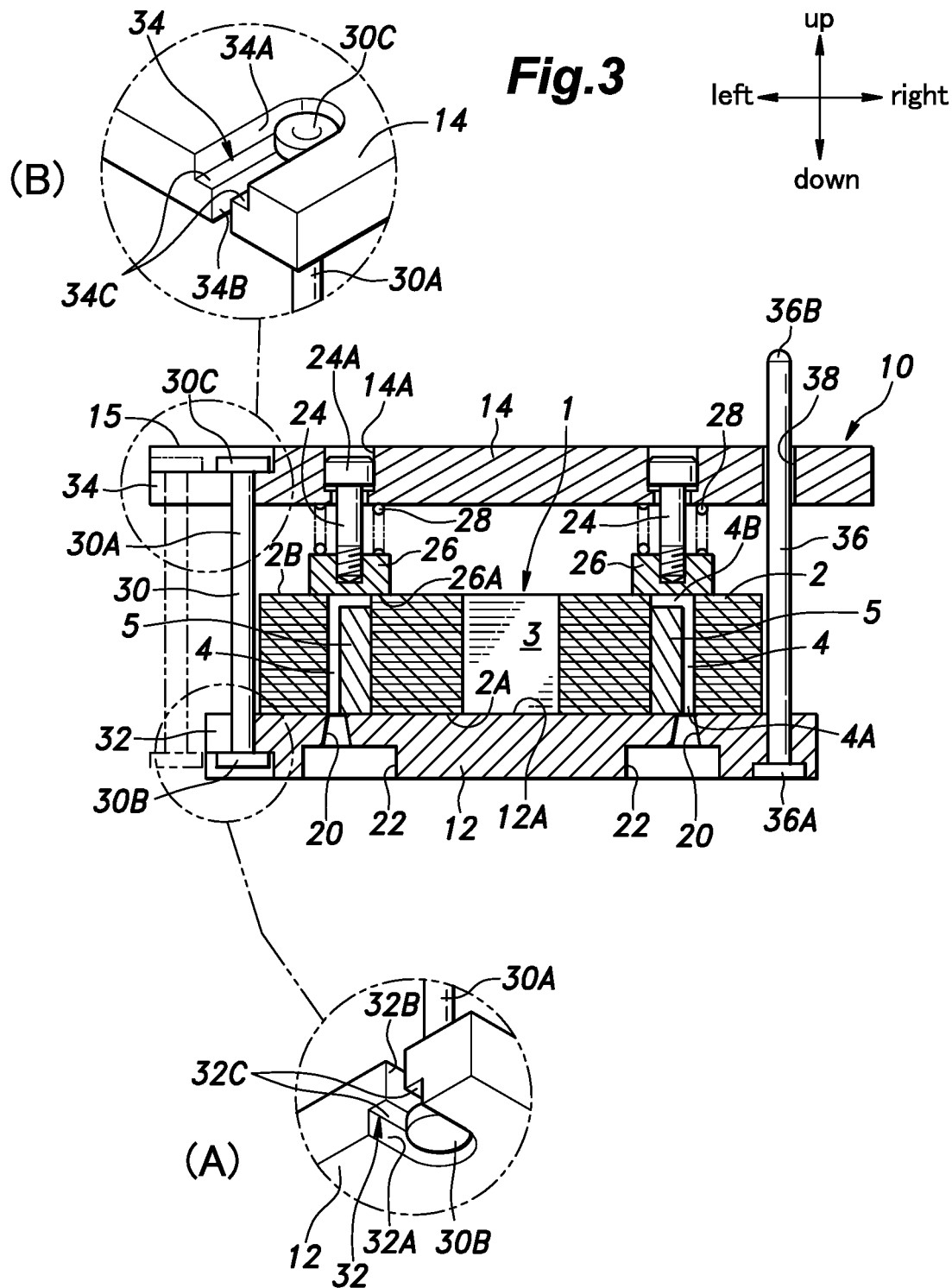
FIG. 3 is a vertical sectional view (a sectional view taken along line in FIG. 4) of a rotor core retaining jig used in the present embodiment.
Figure 4:
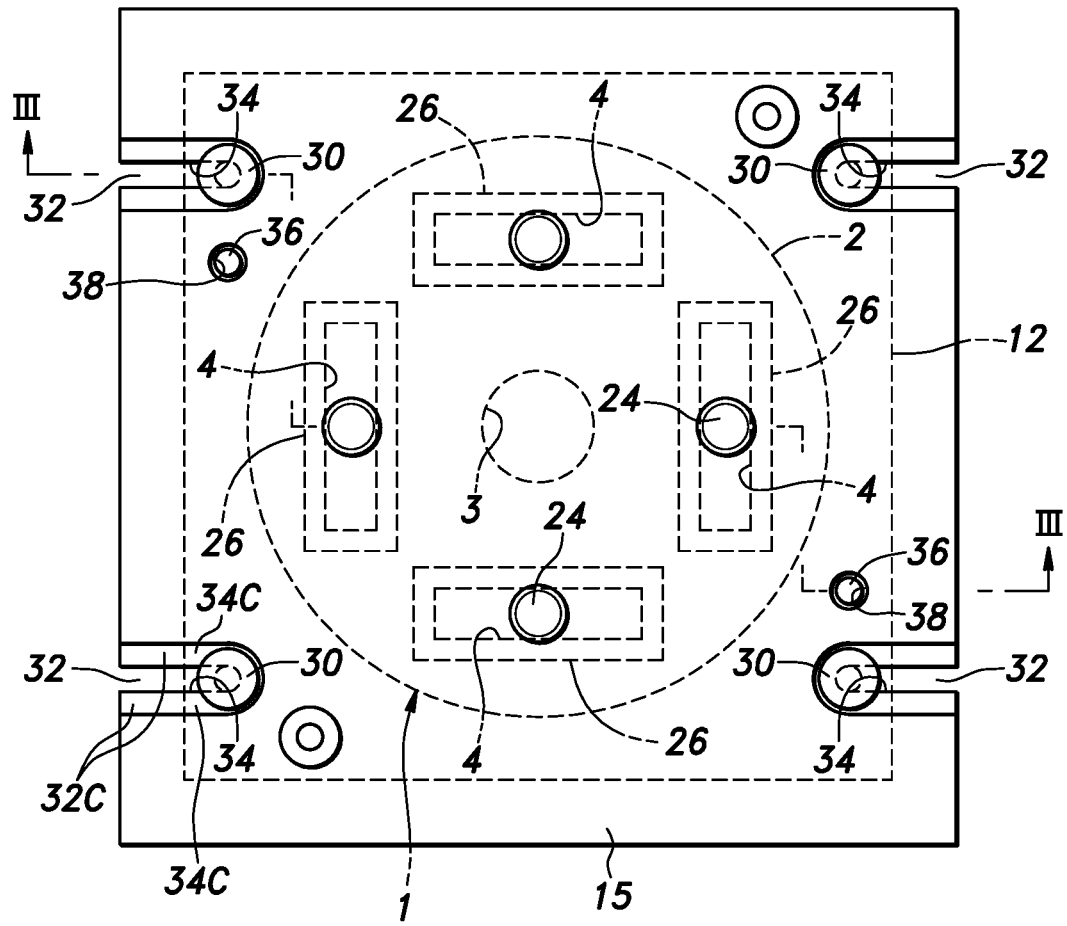
FIG. 4 is a plan view of the rotor core retaining jig used in the present embodiment.

Thereby, the setting of the coupling rods 30 is automated and, as shown in FIG. 3, the rotor core 2 can be treated, together with the rotor core retaining jig 10, as a sub-assembly in that the opening 4B of each magnet insertion hole 4 is closed by the corresponding closure member 26 with a pressing force resulting from the spring force of the compression coil spring 28.

Thereafter, each chuck device 126 returns to the most withdrawn position and each lift base 112 is lowered to the retracted position, and in this state, the rotor core retaining jig 10 is unloaded from the setting device 40.

Figure 9:
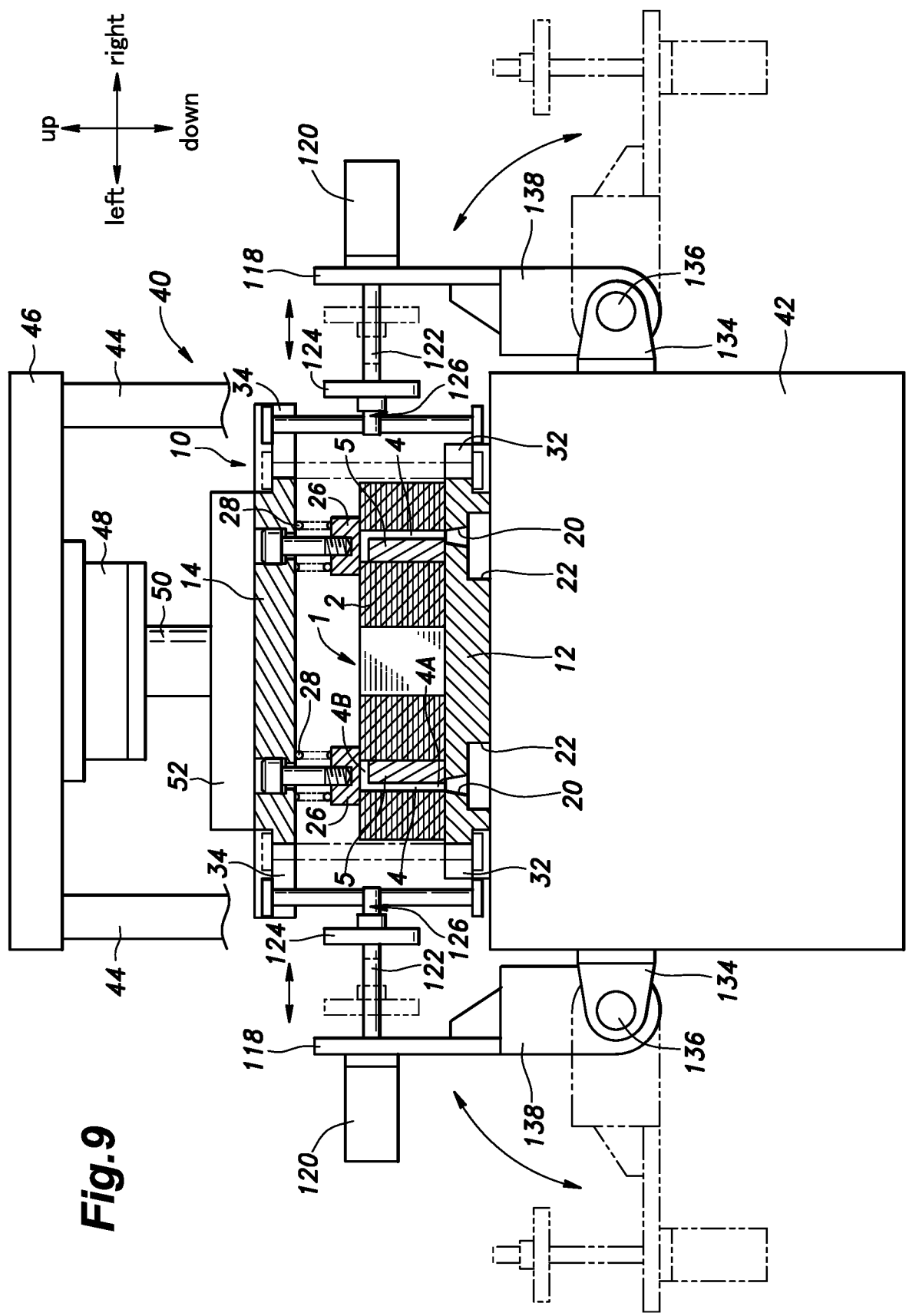
FIG. 9 is a front view of a setting device for a rotor core retaining jig according to another embodiment.

Another embodiment of the setting device 40 will be described with reference to FIG. 9. Note that in FIG. 9, the parts corresponding to those in FIG. 5 to FIG. 7 are denoted by the same reference signs as those in FIG. 5 to FIG. 7, and the description thereof will be omitted.

In this embodiment, brackets 134 are attached on the left and right sides of the support base 42, respectively, and a pivoting base 138 is pivotally mounted to each bracket 134 by means of a pivot shaft 136. Each pivoting base 138 has the cylinder attachment plate 118 attached thereto.

Thereby, each chuck device 126 and the like move to the retracted position by rotation of the pivoting base 138.

The other structure is substantially the same as that of the embodiment shown in FIG. 5 to FIG. 8. Therefore, in this embodiment also, effects similar to those of the embodiment shown in FIG. 5 to FIG. 8 can be obtained.

Figure 10:
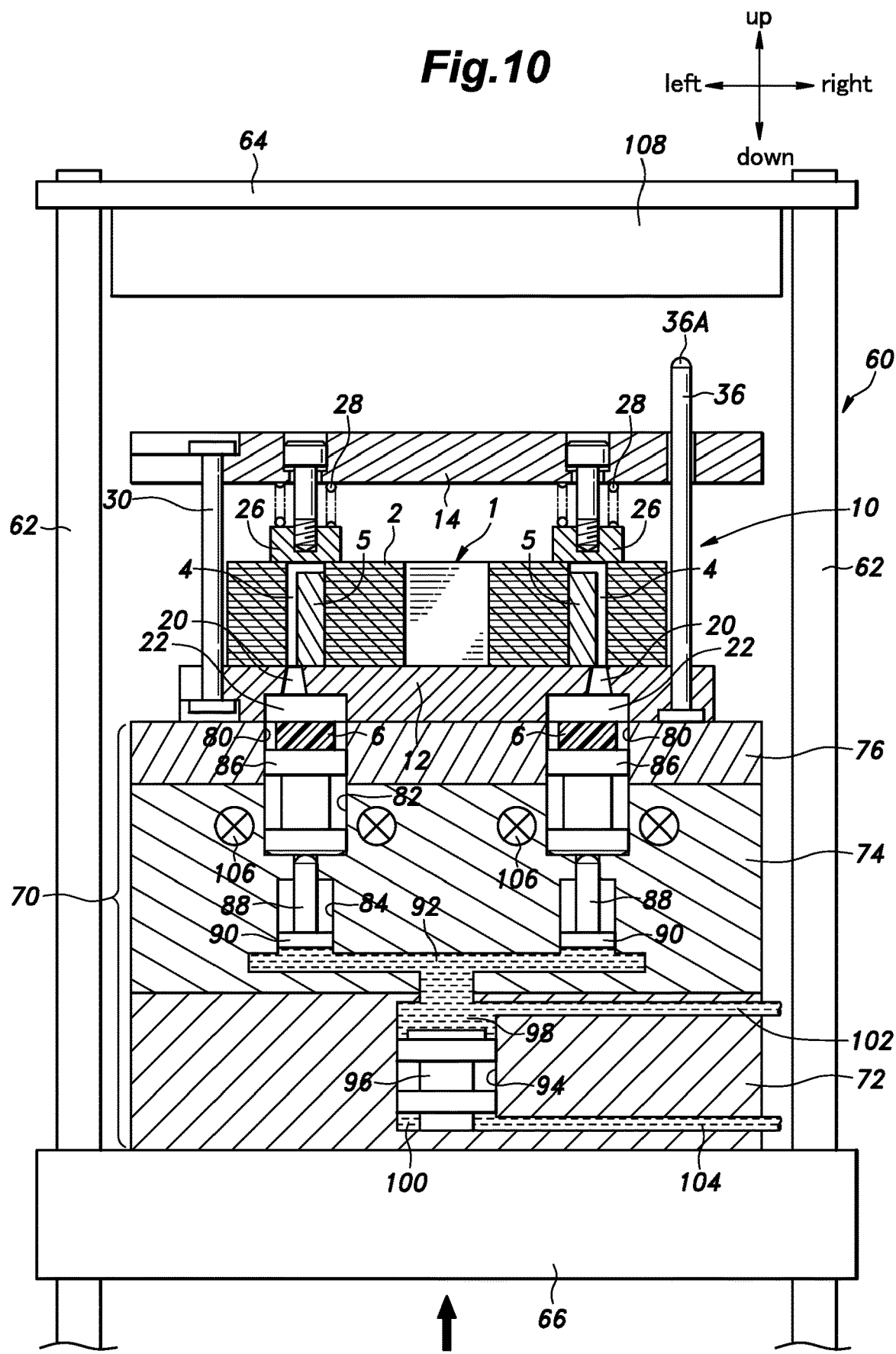
FIG. 10 is a vertical sectional view showing a state where a lower movable member of a resin molding device for the magnet embedded core has been lowered.

Next, a resin molding device 60 will be described with reference to FIG. 10 to FIG. 12.

The resin molding device 60 includes multiple post members 62 that extend vertically, a fixed platen 64 fixed to upper ends of the post members 62, and a movable platen 66 that is movable vertically and guided by the post members 62. The movable platen 66 is driven in the vertical direction by a drive device (not shown) using hydraulic pressure or the like, and can move toward and away from the fixed platen 64.

A lower base member 70 is mounted on the movable platen 66. The lower base member 70 is constituted of an assembly in which a lower member 72, an intermediate member 74, and an upper member 76 are stacked. On the upper member 76, the sub-assembly of the rotor core 2 and the rotor core retaining jig 10 is placed in a state where the movable platen 66 is lowered, as shown in FIG. 10.

The upper member 76 is formed with multiple resin pots 80 corresponding to the respective magnet insertion holes 4 of the rotor core 2. Each resin pot 80 opens in the top surface of the upper member 76 to communicate with the corresponding cull opening 22. The intermediate member 74 is formed with plunger chambers 82 and push rod chambers 84 communicating with the associated resin pots 80. As a resin introducing device for introducing molten resin from the resin pots 80 into the magnet insertion holes 4 via the gates 20, each plunger chamber 82 is provided with a plunger 86 to be vertically movable and each push rod chamber 84 is provided with a push rod 88 to be vertically movable. The resin pots 80, the plunger chambers 82, and the cull openings 22 are bores having the same inner diameter, and each plunger 86 can move into the corresponding cull opening 22 from the corresponding plunger chamber 82.

Solid resin 6 having a block shape is placed on the plunger 86 in each resin pot 80.

Each push rod 88 contacts against the corresponding plunger 86 at an upper end thereof to move the plunger 86 upward. Each push rod 88 has a pressure receiving flange 90 at a lower end thereof, and a hydraulic pressure of hydraulic oil in a manifold oil passage 92 formed in the intermediate member 74 is applied on each pressure receiving flange 90. The lower member 72 is formed with a cylinder chamber 94. The cylinder chamber 94 is provided with a piston 96 so as to be movable vertically. The piston 96 defines an upper oil chamber 98 on an upper side thereof such that the upper oil chamber 98 communicates with the manifold oil passage 92, and defines a lower oil chamber 100 on an underside thereof. The upper oil chamber 98 and the lower oil chamber 100 are connected to a hydraulic pressure source (not shown) by oil passages 102, 104 and the like formed in the lower member 72.

In the lower base member 70, heaters 106 for heating the lower base member 70 are embedded.

An upper opposing member 108 is mounted to a lower part of the fixed platen 64. The upper opposing member 108 opposes the lower base member 70 via the rotor core retaining jig 10 on the lower base member 70, and is relatively movable toward and away from the lower base member 70 as the movable platen 66 is movable toward and away from the fixed platen 64.

Figure 11:
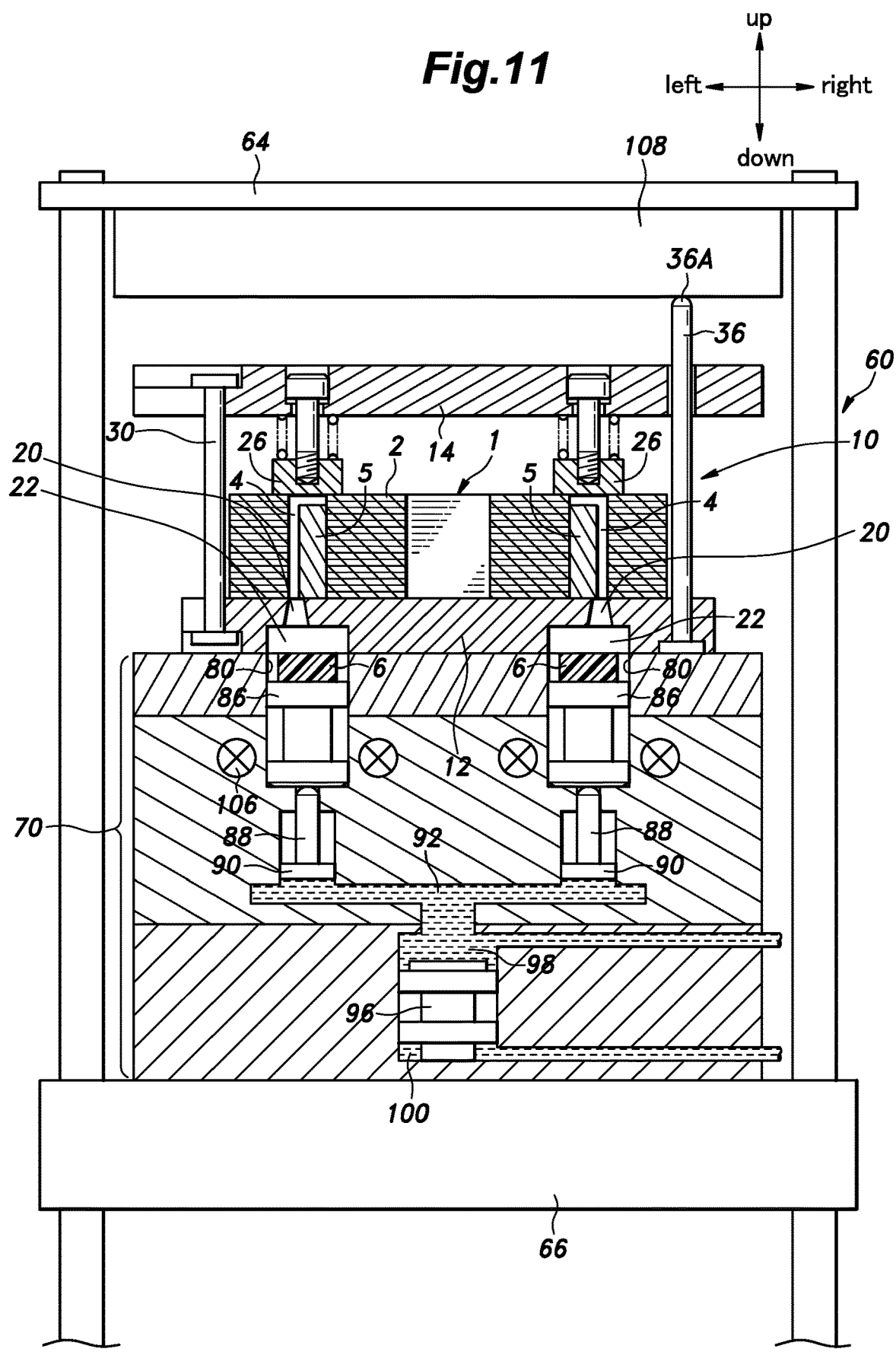
FIG. 11 is a vertical sectional view showing a state where the lower movable member of the resin molding device has been lifted.
Figure 12:
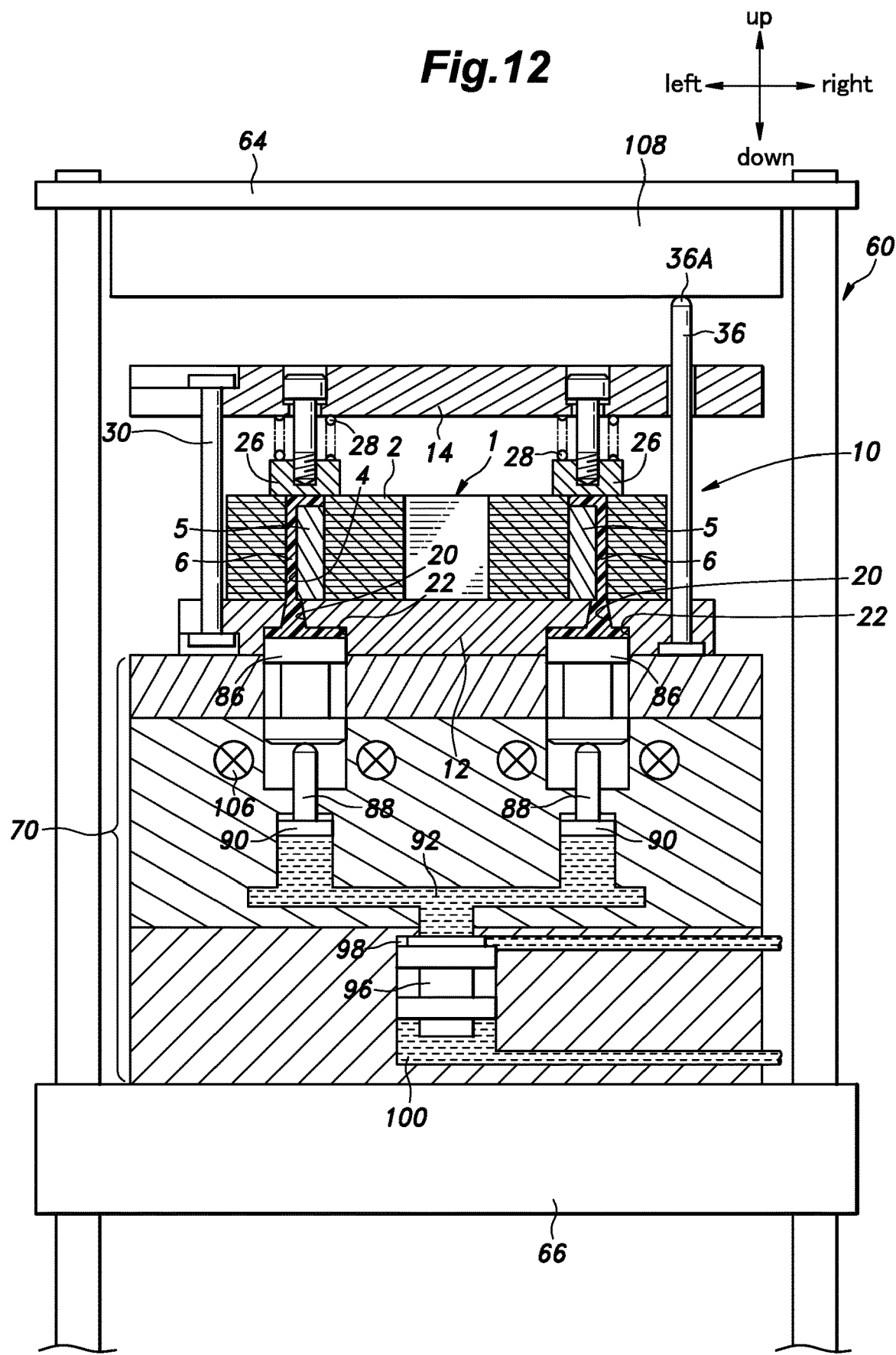
FIG. 12 is a vertical sectional view showing a resin pressurizing state of the resin molding device.

As shown in FIG. 11, each plate pressing rod 36 contacts against the bottom surface of the upper opposing member 108 when the movable platen 66 is moved upward, and the lower plate 12 is pressed against the lower base member 70 by the pressurizing force transmitted from the upper opposing member 108 to the lower plate 12.

Thereby, the force for pressing the lower plate 12 against the lower base member 70 is determined by the lifting force (die clamping force) of the movable platen 66 separately from the force for pressing the closure members 26 against the rotor core 2 by the spring force of the compression coil springs 28 in the rotor core retaining jig 10, and the connection between the cull openings 22 and the resin pots 80 can be achieved without a gap under the force pressing the lower plate 12 against the lower base member 70.

The solid resin 6 in each resin pot 80 is melted when heated by the heaters 106 or the like. Under this state, as shown in FIG. 12, a hydraulic pressure is supplied from the hydraulic pressure source (not shown) to the lower oil chamber 100, and the piston 96 is moved upward so that the pressure is distributed evenly to the pressure receiving flanges 90 and the push rods 88 with the hydraulic oil in the manifold oil passage 92 serving as a pressure medium. Thereby, the plungers 86 are lifted, and the molten resin 6 in each resin pot 80 passes through the corresponding cull opening 22 and gate 20 to be press-fed into the corresponding magnet insertion hole 4 and fill the same.

Because the force pressing the lower plate 12 against the lower base member 70 can be independently set to an appropriate value without excess or insufficiency by adjusting the lifting force of the movable platen 66, the connection between the cull openings 22 and the resin pots 80 can be achieved under an appropriate pressing force that presses the lower plate 12 against the lower base member 70. Thereby, in the process of press-feeding the molten resin 6 from the resin pots 80 to the magnet insertion holes 4, leakage of the molten resin 6 to the outside through an interface between the lower plate 12 and the lower base member 70 is suppressed, and occurrence of burrs at the interface is suppressed.

Because the closure members 26 are pressed against the rotor core 2 by the spring force of the compression coil springs 28 separately from the lifting force of the movable platen 66, the force pressing the closure members 26 against the rotor core 2 can be independently set to an appropriate value without excess or insufficiency, separately from the force pressing the lower plate 12 against the lower base member 70. Thereby, without causing deformation such as a warp in the rotor core 2, the closure of the openings 4B of the magnet insertion holes 4 and the connection between the openings 4A of the magnet insertion holes 4 and the gate 20 can be achieved with an appropriate value of the force pressing the closure members 26 against the rotor core 2. Thereby, in the process of press-feeding the molten resin 6 from the resin pots 80 to the magnet insertion holes 4, leakage of the molten resin 6 to the outside from the openings 4B of the magnet insertion holes 4 or through the interface between the openings 4A of the magnet insertion holes 4 and the gate 20 is suppressed, and occurrence of burrs at the interface or around the openings 4B is suppressed.

In the foregoing, the present invention has been described in terms of specific embodiments, but these embodiments are for illustrative purposes only, and the present invention is not limited by these embodiments.

For example, the mechanism for moving the chuck devices 126 to the retracted position is not indispensable. The engagement grooves 32 and 34 may include those opening in the front and rear outer edges of the lower plate 12 and the upper plate 14 in addition to those opening in the left and right outer edges of the lower plate 12 and the upper plate 14. In this case, the chuck devices 126 and the like are provided corresponding to the front and rear two sides of the lower plate 12 and the upper plate 14 in addition to the left and right two sides, and the chuck devices 126 corresponding to at least one side of the lower plate 12 and the upper plate 14 are configured to move to the retracted position to allow loading and unloading of the rotor core retaining jig 10 to and from the setting device 40. The resin molding device 60 may be arranged upside down.

The constituent elements of the manufacturing method for the magnet embedded core of the present invention shown in the foregoing embodiments are not entirely essential, but may be suitably omitted or substituted without departing from the scope of the present invention.

Glossary 1 magnet embedded core
2 rotor core
2A lower end surface
2B upper end surface (one end surface)
3 axial hole
4 magnet insertion hole
4A opening (one opening)
4B opening (another opening)
5 magnet
10 rotor core retaining jig
12 lower plate (first plate)
12A top surface
14 upper plate (second plate)
14A bolt insertion hole
15 projecting portion
20 gate
22 cull opening
24 bolt
24A head
26 closure member
26A bottom surface
28 compression coil spring
30 coupling rod
30A rod portion
30B flange portion
30C flange portion 32 engagement groove
32A recessed groove
32B opening
32C shoulder portion
34 engagement groove
34A recessed groove
34B opening
34C shoulder portion
36 plate pressing rod
38 through hole
40 setting device
42 support base
44 post member
46 opposing base
48 pressurizing device
50 piston rod
52 pressurizing plate
60 resin molding device
62 post member
64 fixed platen
66 movable platen
70 lower base member
72 lower member
74 intermediate member
76 upper member
80 resin pot
82 plunger chamber
84 push rod chamber
86 plunger
88 push rod
90 pressure receiving flange
92 manifold oil passage
94 cylinder chamber
96 piston
98 upper oil chamber
100 lower oil chamber
102 oil passage
104 oil passage
106 heater
108 upper opposing member
110 guide rail
112 lift base
114 electric motor
116 feed screw
118 cylinder attachment plate
120 fluid pressure cylinder device (drive device)
122 piston rod
124 chuck attachment plate
126 chuck device
128 fixed chuck piece
130 electromagnetic actuator
132 movable chuck piece
134 bracket
136 pivot shaft
138 pivoting base

The invention claimed is:

1. A setting device for a rotor core retaining jig, the rotor core retaining jig comprising a first plate and a second plate that oppose each other and coupling rods each configured to engage engagement grooves in a form of cutouts opening at peripheral edges of the first plate and the second plate such that flange portions at respective ends of each coupling rod contact against the first plate and the second plate, respectively, to couple the first plate and the second plate to each other, wherein a rotor core is to be disposed between the first plate and the second plate, the setting device comprising:
a support base on which the rotor core retaining jig is to be placed;
an opposing base joined to the support base to oppose the support base;
a pressurizing device mounted on the opposing base and configured to pressurize the second plate of the rotor core retaining jig on the support base toward the first plate;
chuck devices mounted on the support base to grip the respective coupling rods and capable of moving between a separated position where the coupling rods are separated from the engagement grooves and an engaged position where the coupling rods engage the engagement grooves; and
a drive device provided on the support base to drive each chuck device between the separated position and the engaged position.

2. The setting device according to claim 1, wherein the rotor core includes a magnet insertion hole having openings in two axial end surfaces of the rotor core, respectively,
the first plate includes a gate configured to communicate with one of the openings of the magnet insertion hole,
the rotor core retaining jig further includes a closure member coupled to the second plate via a compression spring member and configured to contact against one end surface of the end surfaces of the rotor core to close the other of the openings of the magnet insertion hole, and
each coupling rod has an axial length to couple the first plate and the second plate to each other such that in a state where the closure member closes the opening, a spring force of the compression spring member becomes a prescribed value.

3. The setting device according to claim 1, wherein the first plate and the second plate are each rectangular in shape and have the engagement grooves corresponding to at least two sides that are parallel to each other, and
the chuck devices are provided respectively corresponding to the at least two sides of the first plate and the second plate of the rotor core retaining jig placed on the support base.

4. The setting device according to claim 1, wherein the chuck devices are configured to be movable between an operating position which is a position corresponding to between the support base and the opposing base and where the chuck devices are movable between the separated position and the engaged position and a retracted position where the chuck devices do not interfere with the rotor core retaining jig being loaded onto or being unloaded from the support base.

5. The setting device according to claim 1, wherein the support base and the opposing base are spaced from and oppose each other in a vertical direction and the second plate which is positioned on an upper side has a larger outline than the first plate which is positioned on a lower side, and
when not gripped by the chuck devices, the coupling rods engage only the engagement grooves of the second plate and are supported by the second plate in a suspended state.

* * * * *